//2,938,033
STABILIZATION OF VINYLPYRIDINES

Carlyle J. Stehman, Decatur, Ala., assignor to The Chemstrand Corporation, Decatur, Ala., a corporation of Delaware No Drawing. Filed Mar. 16, 1953, Ser. No. 342,758

17 Claims. (Cl. 260—290)

This invention relates to a method for the stabilization of vinylpyridines against polymerization and also relates to the stabilized compositions so prepared.

It is well known that vinylpyridines polymerize upon standing at room temperature and polymerize quite rapidly when heated or exposed to light. For example 2-vinylpyridine, which is a thin mobile liquid, polymerizes to a thick gummy red or brown mass when stored in contact with air at room temperature. When distillation of 2-vinylpyridine is attempted at normal pressure, brownish syrups are formed and very little monomer passes over at 159° C.

Because of this tendency toward polymerization, storage and shipment of vinylpyridines have been difficult problems, sometimes requiring the utilization of artificial cooling means which are quite expensive and which add considerably to the cost of the monomer. I am aware that a number of substances have been proposed as inhibitors for the polymerization of vinylpyridines, but many such substances are expensive, or do not have the property of inhibiting polymerization to a sufficient degree, or cannot readily be removed from the stabilized composition to recover vinylpyridines in substantially pure and polymerizable condition. A particularly serious problem has existed with regard to purification of vinylpyridines by distillation. For example, in order to separate 2-methyl-5-vinylpyridine from 2-methyl-5-ethylpyridine after dehydrogenation of the latter to produce the former, an efficient fractionating column and high reflux ratios are necessary as the boiling points at 15 mm. are only 6° C. apart. To prevent polymerization of the 2-methyl-5-vinylpyridine during this lengthy distillation period requires the addition of a very good polymerization inhibitor.

An object of this invention is to provide a new agent for the stabilization of vinylpyridines. Another object is to provide a stabilizing agent which is effective in small concentrations, inexpensive, and convenient to handle. Still another object is to provide compositions comprising vinylpyridines stabilized against polymerization even during heating to elevated temperatures. Other objects will be apparent from the following description of the invention.

It has now been discovered that the tendency of vinylpyridines to polymerize can be inhibited by adding thereto methylene blue (tetramethylamidophenthiazinium chloride). The quantity of methylene blue to be added cannot be stated with certainty because this will vary between vinylpyridines, and depends on the particular use to be made of the vinylpyridine. For example, minute quantities are sufficient to inhibit vinylpyridines against polymerization during ordinary storage conditions, whereas as much as 2.0 percent may be required to completely inhibit polymerization of certain vinylpyridines during distillation. The exact amount to be used under any given conditions can easily be determined by experimentation.

The methylene blue can be added to the vinylpyridine in any manner, the only requirement being that it be mixed with the vinylpyridines as homogeneously as possible.

The following table illustrates the effectiveness of the inhibitor of this invention as compared to a control and to inhibitors heretofore known in the art. In the experiments reported in the table, samples of 2-methyl-5-vinylpyridine were subjected to extreme conditions to induce polymerization. The samples were held in closed tubes at 80–84° C. until polymerization occurred as shown by testing a portion at various periods in a 1:10 dilution with hexane. A haze or cloudiness in the test mixture indicated presence of the polymer, because of insolubility of the polymer in hexane (the monomer is soluble). The elevated temperatures were chosen so that the test could serve as an accelerated storage test as well as indicate the effectiveness of inhibitors during distillation of the monomer. The temperatures were extreme, however, since 2-methyl-5-vinylpyridine boils at 75° C. (15 mm.).

Table

| Inhibitor | Concentration, percent on monomer weight | Hours to show Polymer |
|---|---|---|
| None (control) | | 1 |
| Sulfur | 0.2 | 2.2 |
| o-Nitrophenol | 0.2 | 1.5 |
| β-Nitrostyrene | 0.1 | 0.75 |
| t-Butyl catechol | 0.1 | 5 |
| Hydroquinone | | |
| Monobenzyl ether | 0.1 | 0.5 |
| Methylene blue | 0.1 | 120 |

The vinylpyridines can readily be recovered in pure, polymerizable form from the inhibited form by distilling or by washing with a solvent for the inhibitor which is a non-solvent for the vinylpyridine. It is usually not necessary that the vinylpyridine be separated from the inhibitor, however, because methylene blue does not prevent polymerization of vinylpyridines under the conditions usually employed. Even in the presence of methylene blue, vinylpyridines can be polymerized by the use of peroxide catalysts in the usual emulsion polymerization methods.

The vinylpyridines which have been found to be inhibited by methylene blue include all those compounds having the structure:

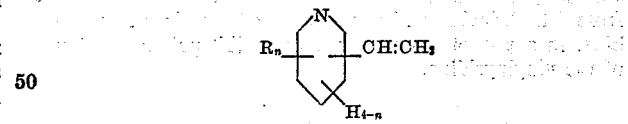

wherein R represents methyl or ethyl radicals and $n$ represents an integer from 0 to 4 inclusive. As examples of these compounds which are inhibited against polymerization by methylene blue may be mentioned the 2-, 3-, and 4-vinylpyridines, 5-ethyl-2-vinylpyridine, 2-methyl-5-vinylpyridine, 2-methyl-6-vinylpyridine, and 2,4-dimethyl-6-vinylpyridine.

We claim:

1. The method of stabilizing a vinylpyridine having the structure

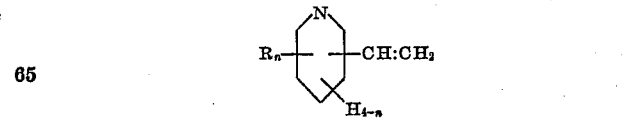

wherein R represents a member selected from the group consisting of methyl and ethyl and $n$ represents an integer from 0 to 4, inclusive, against polymerization which comprises adding to said vinylpyridine a small amount of methylene blue.

2. The method of stabilizing a vinylpyridine having the structure

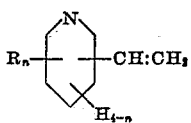

wherein R represents a member selected from the group consisting of methyl and ethyl and $n$ represents an integer from 0 to 4, inclusive, against polymerization during storage or shipment which comprises incorporating in said vinylpyridine an amount of methylene blue sufficient to inhibit polymerization.

3. A liquid composition comprising a vinylpyridine having the structure

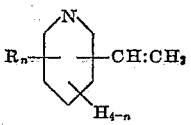

wherein R represents a member selected from the group consisting of methyl and ethyl and $n$ represents an integer from 0 to 4, inclusive, and a proportion of methylene blue sufficient to inhibit polymerization.

4. A composition of matter comprising a vinylpyridine having the structure

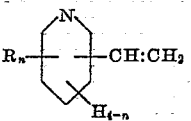

wherein R represents a member selected from the group consisting of methyl and ethyl and $n$ represents an integer from 0 to 4, inclusive, having dissolved therein methylene blue.

5. A composition of matter comprising a vinylpyridine having the structure

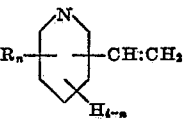

wherein R represents a member selected from the group consisting of methyl and ethyl and $n$ represents an integer from 0 to 4, inclusive, having dissolved therein methylene blue, in a proportion sufficient to inhibit polymerization of the vinylpyridine.

6. A stabilized vinylpyridine having the structure

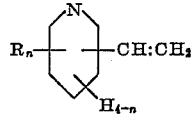

wherein R represents a member selected from the group consisting of methyl and ethyl and $n$ represents an integer from 0 to 4, inclusive, containing up to 2.0 percent of methylene blue as a stabilizing agent.

7. In the method of purifying a vinylpyridine having the structure

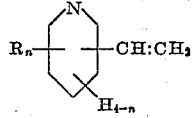

wherein R represents a member selected from the group consisting of methyl and ethyl and $n$ represents an integer from 0 to 4, inclusive, by distillation, the improvement which comprises incorporating in said vinylpyridine a proportion of methylene blue sufficient to inhibit polymerization of the vinylpyridine during distillation.

8. The method of claim 2 wherein the vinylpyridine is 2-methyl-5-vinylpyridine.
9. The method of claim 2 wherein the vinylpyridine is 5-ethyl-2-vinylpyridine.
10. The method of claim 2 wherein the vinylpyridine is 2-ethyl-5-vinylpyridine.
11. The method of claim 2 wherein the vinylpyridine is 2-vinylpyridine.
12. The method of claim 2 wherein the vinylpyridine is 4-vinylpyridine.
13. The composition of claim 5 in which the vinylpyridine is 2-methyl-5-vinylpyridine.
14. The composition of claim 5 in which the vinylpyridine is 5-ethyl-2-vinylpyridine.
15. The composition of claim 5 in which the vinylpyridine is 2-ethyl-5-vinylpyridine.
16. The composition of claim 5 in which the vinylpyridine is 2-vinylpyridine.
17. The composition of claim 5 in which the vinylpyridine is 5-vinylpyridine.

References Cited in the file of this patent
UNITED STATES PATENTS

| | | |
|---|---|---|
| 2,445,367 | Robey et al. | July 20, 1948 |
| 2,733,259 | De Croes et al. | Jan. 31, 1956 |

OTHER REFERENCES

Frank et al.: Journal Amer. Chem. Soc. (1946), vol. 68, p. 908, Chemical Abstracts (1947), vol. 41, p. 6191c.